United States Patent [19]
Brescia

[11] 3,894,467
[45] July 15, 1975

[54] EXPANSION NAIL

[76] Inventor: Carl Brescia, 1713 Williamsbridge Rd., Bronx, N.Y. 10461

[22] Filed: Mar. 13, 1974

[21] Appl. No.: 450,724

[52] U.S. Cl. .................................................. 85/23
[51] Int. Cl.² ....................................... F16B 15/00
[58] Field of Search ............. 85/23, 3 S, 66, 80, 27, 85/87, 72, 68; 151/41.73

[56] References Cited
UNITED STATES PATENTS

| | | | |
|---|---|---|---|
| 838,203 | 12/1906 | Neil | 85/23 X |
| 1,162,266 | 11/1915 | Weiss | 85/23 |
| 1,456,363 | 5/1923 | Crippen | 85/23 |
| 1,462,761 | 7/1923 | Kugler | 85/23 X |
| 2,404,928 | 7/1946 | Schutten | 85/23 |
| 2,614,450 | 10/1952 | Oltz et al. | 85/23 |
| 3,133,378 | 5/1964 | Poupitch | 85/23 X |
| 3,448,651 | 6/1969 | Passer | 85/72 |
| 3,511,128 | 5/1970 | Garrison | 85/23 |

*Primary Examiner*—Ramon S. Britts
*Attorney, Agent, or Firm*—Hane, Baxley & Spiecens

[57] ABSTRACT

There is disclosed an expansion nail designed for driving into and through wallboard and having a substantial load bearing capability. The shank or stem of the nail comprises crosswise holes therethrough, into which anchor members of generally U-shaped configuration and made of a length of springy wire or strip are fitted. The arms of each member are so disposed and biased that they define when relaxed an acute angle relative to the lengthwise axis of the nail and face toward the head of the nail. A casing or sleeve is slidably fitted upon the nail so that it holds the arms flat against the nail. The sleeve is lengthwise slit to form two or more separate parts which are initially joined by a suitable frangible material such as glue or score lines. When such expansion nail is driven into and through wallboard the jolts caused by the hammer blows will break the joints between the sleeve parts and upon driving the nail into a position in which the sleeve has completely penetrated the wallboard, the biased arms will snap open and thus abut against the inside of the wallboard thereby effectively preventing a pulling or falling out of the nail.

6 Claims, 6 Drawing Figures

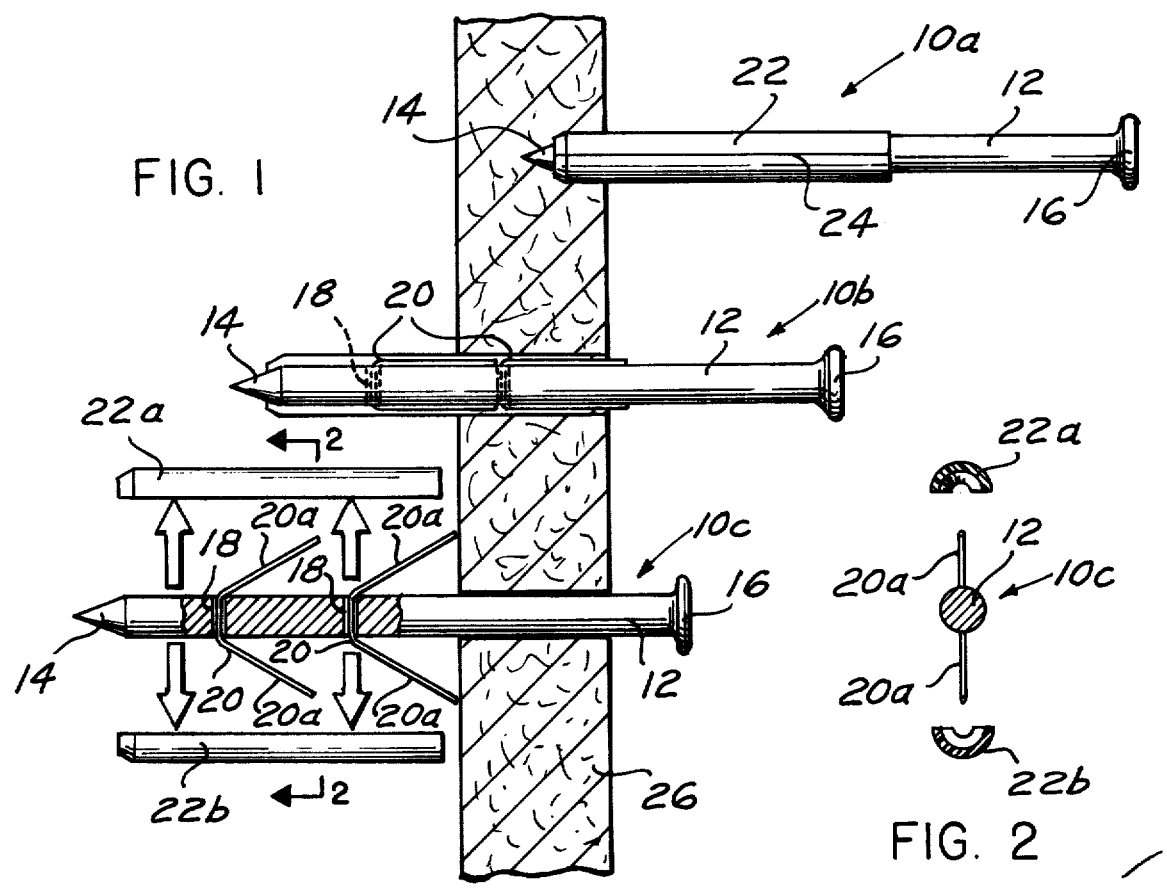
FIG. 1
FIG. 2
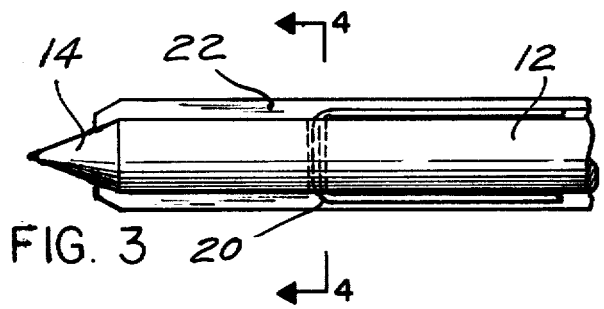
FIG. 3
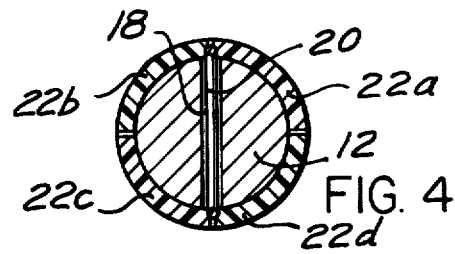
FIG. 4
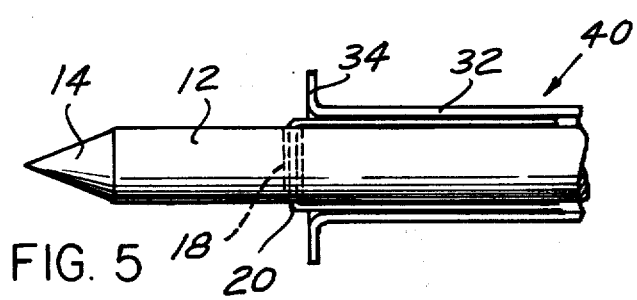
FIG. 5
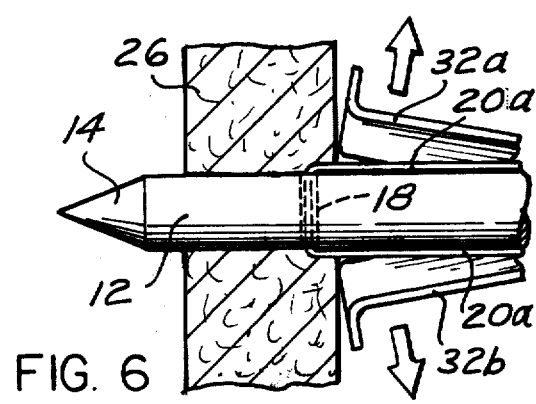
FIG. 6

EXPANSION NAIL

The invention relates to an expansion nail for driving into and through wallboard, and more particularly to an expansion nail having a considerable load bearing capability when driven into and through wallboard.

BACKGROUND

Wallboard is now widely used for erecting walls, and particularly partition walls in building structures. Partition walls of this kind are usually constructed by two panels of wallboard secured to studs and spaced apart from each other by the studs. The space between the wallboards may be filled with suitable insulation material such as rock wool or packed fiberglass.

There are known various types of wallboards such as plasterboard, sheetrock, etc. Partition walls of the kind here described can be erected rapidly and fairly inexpensively; they also have good heat-insulating and sound-proofing properties. However, any type of wallboard as now known is soft and hence has a low load bearing capability. As a result, any nail or screw driven or screwed into the wallboard will tend to fall out or be pulled out when a load has to be supported by such nail or screw. Practical experience shows that it is difficult to obtain sufficient support for mounting shelves, pictures, etc. on a partition wall made of wallboard unless the nail or screw can be driven into one of the studs to which the wallboard is secured, and this is not always possible. Accordingly, mounting of parts of any weight on partition walls presents a problem.

In order to solve this problem, there are available various types of expansion fasteners wherein a hole is drilled in the wallboard. The hole is then fitted with a circumferentially expandable sleeve and a screw or the like driven into the sleeve. Such fasteners, while inexpensive, have many drawbacks. For instance, if the wallboard has no backing there is a definite possibility of the sleeve being lost behind the wallboard, especially if the diameter of the hole is larger than the outer diameter of the fastener in its non-expanded state. Furthermore, the initial hole must be drilled in the wallboard and the expansion element inserted in the hole before the screw is finally driven into place.

There are other more complicated fasteners which by means of stops and/or flanges hold the sleeve element in place while the screw is being driven.

In any event, most such fasteners are of the screw type which involve considerable expense with respect to the cost of the item but also with respect to the labor cost of installation.

SUMMARY OF THE INVENTION

It is therefore an object of the invention to provide a wallboard expansion device which is of the nail variety as opposed to the screw-type.

It is another object of the invention to provide a wallboard expansion nail which is not only relatively inexpensive but which can also readily be installed in a single operation.

It is yet another object of the invention to provide a wallboard expansion nail which can be used not only as a supporting projection from the wall, but also to secure a variety of items to the wall.

It is a further object of the invention to provide a wallboard expansion nail which is sturdy and reliable.

It is an additional object of the invention to provide a generally improved wallboard expansion nail.

Other objects, features and advantages of the invention will be apparent from the following detailed description when read with the accompanying drawing, which shows by way of example, and not by way of limitation, wallboard expansion nails in accordance with the invention.

BRIEF DESCRIPTION OF THE DRAWING

In the drawings:

FIG. 1 shows anchor nails in accordance with the invention, the nails being illustrated in different stages of being driven into a wallboard;

FIG. 2 is a cross-sectional view of the anchor nail taken along the line 2—2 of FIG. 1;

FIG. 3 is a side view of a portion of another embodiment of the anchor nail;

FIG. 4 is an enlarged cross-sectional view taken along line 4—4 of FIG. 3;

FIG. 5 is a side view of a further embodiment of the anchor nail of the invention; and FIG. 6 shows the anchor nail of FIG. 5 being driven into a wallboard.

DESCRIPTION OF PREFERRED EMBODIMENTS

Referring now to the FIGS. in detail, and first to FIG. 1, this figure shows a wallboard 10 of the general kind above referred to and three expansion nails according to the invention. More specifically, a nail 12a shown at the top has just entered the wallboard; an intermediate nail 12b is driven through the wallboard but still in its non-expanded state and a nail 12c is shown in its fully operational position.

The expansion nail comprises a nail of generally conventional design, that is, a nail which has a stem or shank 14 usually of circular cross-section, a generally conically shaped tip 16 and a head 18. Stem 14 includes one or more transverse holes 20 therethrough, two such holes being shown in axial spacing. Each of the holes has inserted thereinto a generally U-shaped anchor member 22. This member is made of springy wire or strip material. The bight of the member is preferably flat and located within the respective hole 20. Each member terminates in arms or branches 22a and 22b which are so biased that when relaxed they will occupy the position shown for nail 12c in FIG. 1, that is, the arms define an acute angle with the lengthwise axis of the nail. As FIG. 1 also clearly shows, the arms of the anchor members are so oriented that they face toward head 18 of the nail for a purpose which will be more fully explained hereinafter.

The expansion nail according to the invention further comprises a sleeve or casing 24 which is separable in two or more lengthwise sections or parts 24a and 24b. The two parts of the sleeve are initially joined by means which will readily fracture when subjected to an impact such as produced by hammer blows applied for driving a nail into and through a wallboard. Various means are suitable for the purpose; for instance, the sleeve may be lengthwise slit as it is indicated in FIG. 1 at 26, and as is also apparent from FIG. 2. A suitable glue, especially a glue which is rather brittle, may be used to join the two sleeve parts. A soft solder joint would also be suitable. It is further possible to join the parts by providing weakened or score lines which will cause separation of the parts in response to impact.

As it is shown in FIG. 1, the length and positioning of the sleeve are so that it will jacket the anchor members thereby forcing the arms thereof flat against the shank of the nail as it is clearly shown for nail 12b in FIG. 1. The tip end of the sleeve 24 is preferably conical as it is shown at 28 and so dimensioned that the tip 16 of stem 14 protrudes from the sleeve.

Expansion nail 12a of FIG. 1 shows the configuration of the nail prior to driving thereof. As is is evident, a nail in this inactive position can be conveniently stored and shipped as any conventional nail.

Assuming now that a nail is to be mounted in wallboard 10, driving of an expansion nail according to the invention by hammer blows is effected in the same manner as driving of a conventional nail. As it is apparent, the nail does not offer considerably more resistance to driving than would a conventional nail, but the hammer blows will tend to loosen and finally break the aforesdescribed joint between sleeve parts 24a and 24b. Moreover, the protrusion of nail tip 16 and the resistance experienced by conical sleeve portion 28 which is the portion of the sleeve, which must displace the material of the wallboard which the nail has to penetrate will assist in the destruction of the aforedescribed joint. As a result, driving of the nail into the position shown for nail 12c in FIG. 1 will cause arms 22a and 22b to snap open thereby causing the two parts 24a and 24b of the sleeve to fall away.

As is also clearly shown in FIG. 1, any withdrawal of the nail out of the wallboard will be reliably and strongly resisted by the ends of arms 20a and 20b of the one of the anchor members now abutting against the inside of the wallboard.

As may be observed, the second anchor member remains inactive. However, the purpose of the second anchor member is to compensate for various thicknesses of the wallboard. It is for instance conceivable that the wallboard may be so thick that the anchor member closer to the head 18 will remain in its folded position, but that the arms of the anchor members are freed for snapping apart. In some cases it may be found advisable to supply more than two anchor members. Moreover, while the anchor members are shown as being located in the same plane, they can also be arranged in circumferentially spaced planes.

Turning now to FIGS. 3 and 4, these figures show an expansion anchor in which the sleeve can separate into four parts. Again, the four parts must be frangibly joined as hereinbefore described. It is believed that the figures will be readily understandable from the previous description.

FIGS. 5 and 6 show an embodiment of an expansion nail which employs the same principle as previously described, except that sleeve 24 does not terminate in the conical end as shown in FIGS. 1 and 3, but in a peripheral outwardly protruding flange 30. As it is apparent, this flange will abut against the wallboard when and while the nail is being driven. As a result, the sleeve will be restrained from entering the wallboard as is described in connection with the previous figures due to the strong resistance experienced by flange 20 when it comes into abutment with the outside wall of the wallboard. As a result, the sleeve will fall apart on the outside of the wallboard. However, the anchor members will remain in their folded position as they are being held in that position by the boundary walls of the hole formed in the wallboard by the nail as it penetrates the same. Otherwise, the operation is the same as previously described.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A wall board expansion nail for driving through wall board from one side thereof and into space on the other side of the wall board, said nail comprising:

an elongate nail-like stem member having a pointed end and a head end, said stem member having a length greater than the thickness of wall board through which it is to be driven;

a passageway extending transversely through a portion of said stem member adjacent to the pointed end thereof;

a springy anchor member extended through the passageway, said anchor member having arms extending beyond the passageway in the direction toward said head end and being biased to define, when relaxed, an acute angle with the axis of said stem member;

an open-ended sleeve circumferentially covering at least a portion of said stem member and the arms of said anchor member, the inner peripheral outline of said sleeve being such that the arms are held flat to the outside of the stem member, against the bias applied to said arms and the length and location of said sleeve being such that it is fully outside of the wall board when the stem member is driven through the same and protrudes into the space on the other side of the wall board;

said sleeve being separable into at least two axially extending parts; and shock-sensitive joining means frangibly joining said parts, joining means being fractured by blows applied to said head end when and while the stem member is driven through the wall board and into said space thereby causing separation of said parts and spreading of the anchor members.

2. The nail of claim 1 wherein said sleeve is provided with axially extending grooves which define said axially extending sleeve parts.

3. The nail of claim 1 wherein said passageway is a straight bore crosswise of said stem member, and wherein said anchor member comprises a straight base portion fitted in said bore and two arms each extending from the end of said straight base portion and being biased to occupy said acute angle relative to the lengthwise axis of the stem member.

4. The nail according to claim 1 wherein at least a second passageway and an anchor member inserted into said passageway are provided, said second passageway being axially spaced from the other passageway.

5. The nail of claim 1 wherein said joining means comprise a brittle adhesive.

6. The nail of claim 1 wherein said pointed end of the stem member is generally conically shaped and the sleeve at its end adjacent to said pointed end terminates in a matchingly tapered portion partly encompassing said conical end, the tip of the pointed stem member end protruding from the tapered sleeve end.

* * * * *